United States Patent [19]
Watasue et al.

[11] 4,332,208
[45] Jun. 1, 1982

[54] SEWING MACHINE SPEED CONTROL CIRCUIT

[75] Inventors: Toshiaki Watasue, Tokyo; Hachiro Makabe, Hachioji, both of Japan

[73] Assignee: Janome Sewing Machine Co., Ltd., Tokyo, Japan

[21] Appl. No.: 43,223

[22] Filed: May 29, 1979

[30] Foreign Application Priority Data

Jun. 1, 1978 [JP] Japan .................................. 53-64936

[51] Int. Cl.³ ............................................ D05B 69/18
[52] U.S. Cl. .................................... 112/277; 318/341
[58] Field of Search ........... 112/220, 277, 275, 121.11, 112/121.12; 318/341, 345 E, 268, 269

[56] References Cited

U.S. PATENT DOCUMENTS

| 3,217,679 | 11/1965 | Novak | 112/277 |
| 4,014,277 | 3/1977 | Morinaga | 112/277 |
| 4,052,646 | 10/1977 | Massey et al. | 318/341 X |
| 4,217,841 | 8/1980 | Daido et al. | 112/277 |

FOREIGN PATENT DOCUMENTS

47-23151 11/1972 Japan .................................. 112/277

*Primary Examiner*—Peter P. Nerbun
*Attorney, Agent, or Firm*—Michael J. Striker

[57] ABSTRACT

A sewing machine control circuit is disclosed in which acceleration or deceleration of the machine is effected by the operator in such a way as to gradually increase or decrease motor speed during periods of operator intervention and to maintain whatever speed exists at the time operator intervention ceases. Improved circuitry is utilized to perform these functions.

11 Claims, 11 Drawing Figures

FIG_2-B

FIG_3

FIG_4

SEWING MACHINE SPEED CONTROL CIRCUIT

BRIEF DESCRIPTION OF THE INVENTION

The present invention relates to an electric sewing machine. Namely, according to the invention, the rotation speed of the sewing machine is gradually accelerated up to a predetermined maximum speed by continuously operating one operating element. When the operating element is released on the way, the machine speed at the time is maintained. On the other hand, the speed is gradually reduced down to a certain minimum speed or until the sewing machine is stopped by continuously operating another operating element. Similarly when the operating element is released on the way, the machine speed at that time is maintained.

In the conventional pedal stepping speed control device of the sewing machine, a pedal stepping amount determines the speed of the sewing machine, and when the sewing operation is continued at a constant speed for a long time, the same stepping amount of the pedal has to be manually maintained. The portable sewing machines have recently been popularized and some of these machines are provided with a manual push button system in place of the pedal stepping speed control system. However, such a system is a very rough in actually selecting a desired speed, and if trying to select a desired speed, the operation is considerably difficult.

The present invention has been devised to eliminate the disadvantages in the prior art. It is a primary object of the invention to provide an electric sewing machine excellent in the speed control operation.

It is another object of the invention to easily and smoothly control the speed acceleration, the speed reduction and the maintenance thereof.

The other features and advantages of the invention will be apparent from the following description of the invention in reference to the preferred embodiment as shown in the attached drawings.

DETAILED DESCRIPTION OF THE PREFERRED EMBODIMENTS

Figure 1:
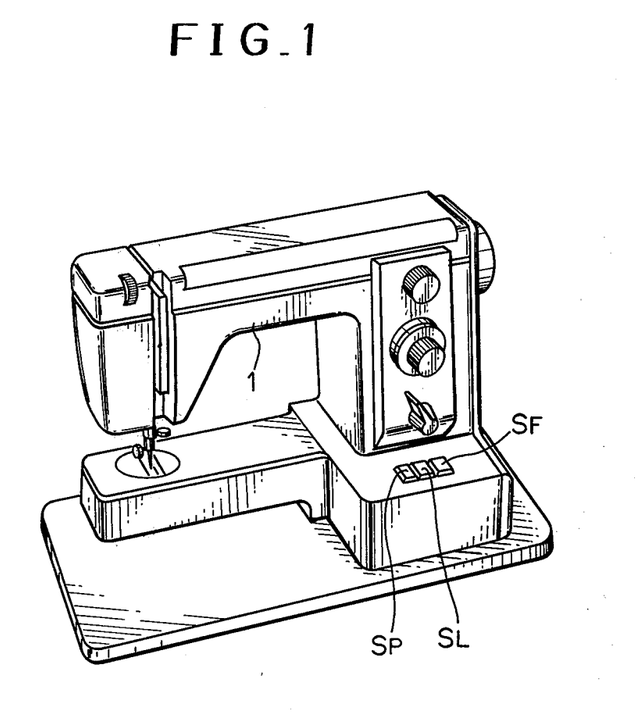
FIG. 1 shows an outline of the sewing machine according to the invention.

In FIG. 1 of the drawings, a reference numeral 1 denotes a sewing machine. $S_F$ is an operation switch for designating speed acceleration. While the switch is pressed, the rotation speed of the sewing machine gradually increases, and when it is released, the speed at that time is maintained. $S_L$ is an operation switch for designating speed reduction. While the switch is pressed, the rotation speed of the sewing machine is gradually reduced, and when it is released, the speed at that time is maintained. $S_P$ is a switch which is pressed to stop the rotation of the sewing machine.

Figure 2:
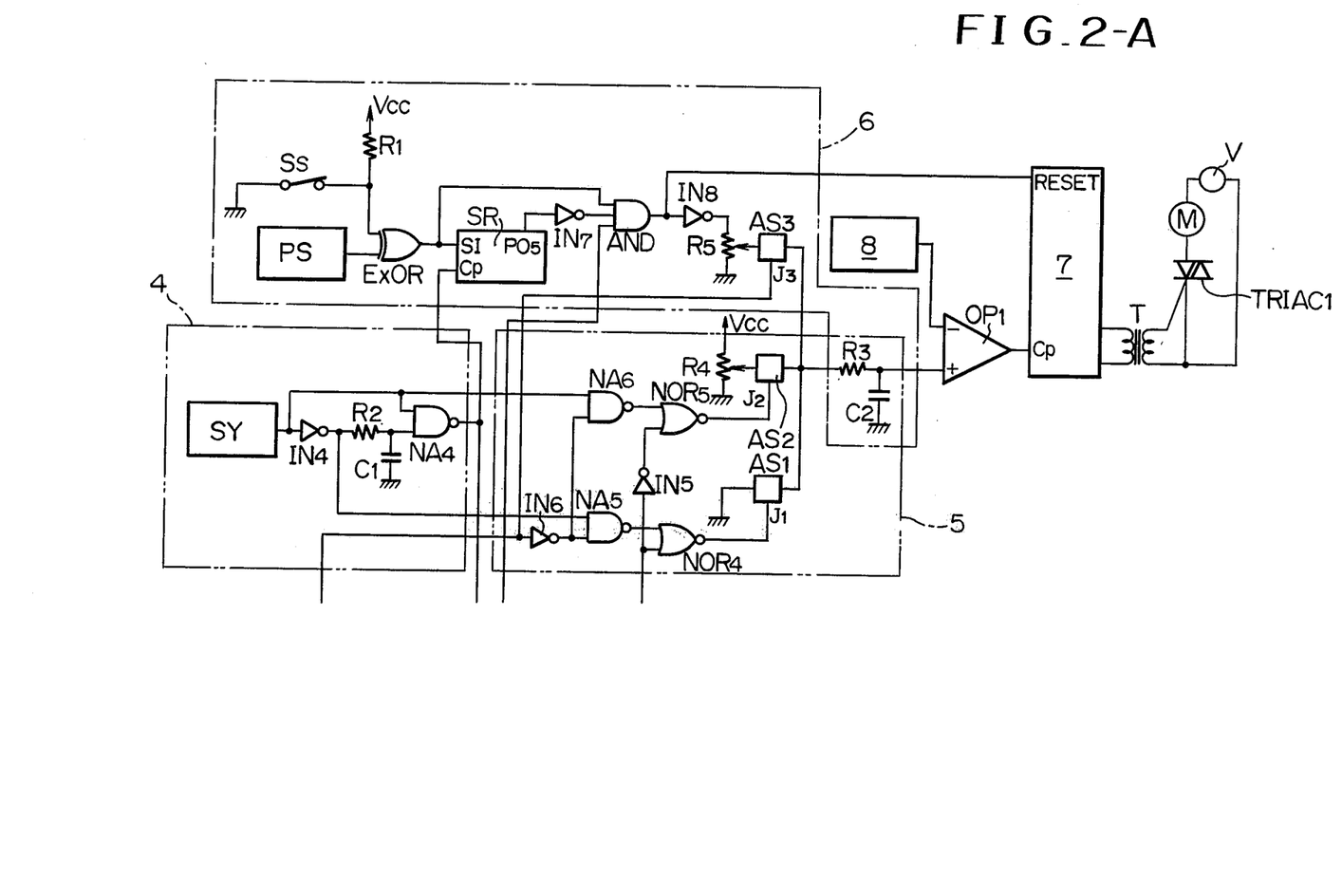
FIGS. 2A and 2B show a control circuit diagram of the above.
Figure 3:
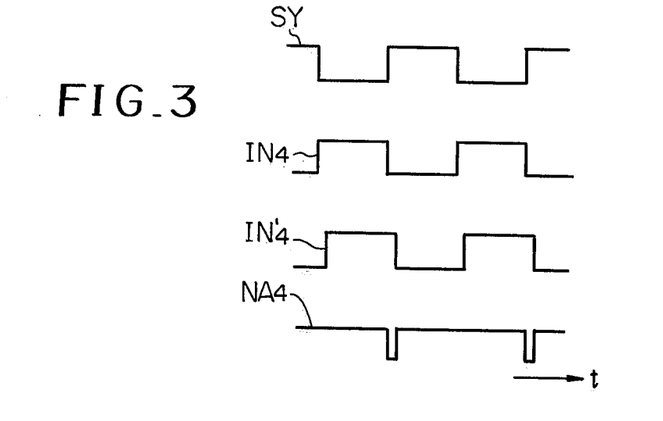
FIG. 3–FIG. 6 show control signal waves in the circuit elements.
Figure 4:
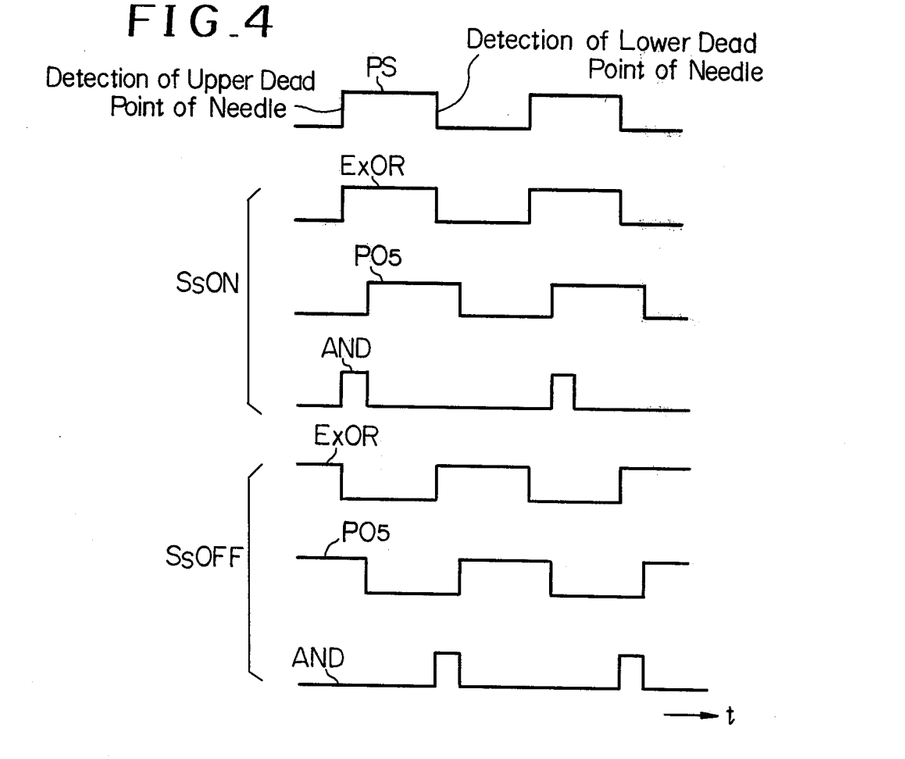
Figure 5:
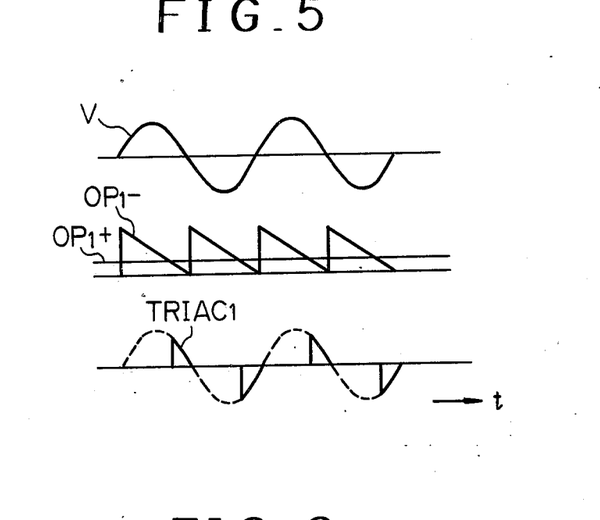

In FIG. 2, a reference V is AC power source. M is a machine motor. $TRIAC_1$ is a two-way thyristor for controlling the speed of the motor, which is controlled of ignition phase by a pulse from a pulse transformer T. Numeral 2 is a speed designating circuit including an up-and-down counter $COUNT_1$ which produces the two-value code outputs $A_4, A_3, A_2, A_1$ designating a rotation speed of the sewing machine by operation of the switches $S_F, S_L, S_P$. The counter $COUNT_1$ has the inputs $I_1-I_4$ each connected to a positive power source Vcc via a pull-up resistor $R_1$. When the power source Vcc is supplied, a load terminal LOAD loads the inputs $I_4, I_3, I_2, I_1$ with a high level H, and renders all of the outputs $A_4, A_3, A_2, A_1$ a high level H. The four outputs at a high level H correspond to stopping the motor M, and those at a low level L correspond to the maximum speed of the motor M. Thus, the motor speed is controlled in correspondence to each number of 0 to 15 when the group of four outputs are considered in the decimal numbers. $AM_1$ is an oscillator producing a clock pulse in a constant period of e.g., 0.1 to 1 second, which is connected to a count-up terminal UP and to a count-down terminal DOWN of the counter $COUNT_1$ via NAND circuit $NA_1$ and $NA_2$ respectively, and its oscillating speed constitutes a speed for advancing or delaying the output code of the counter $COUNT_1$. $FF_1$ and $FF_2$ are D type flip-flop circuits respectively for designating the speed acceleration and the speed reduction, and each has a gate terminal Cp connected to the oscillator $AM_1$. The data terminals D are each switched over to the low level L by pushing the switches $S_F, S_L$ and are switched over to the high level H by releasing the switches. The complement side outputs $\overline{Q}$ are each connected to $NA_1, NA_2$. The speed acceleration switch is pushed to cause NAND circuit $NA_1$ to make effective the signal of the oscillator $AM_1$ to the DOWN terminal DOWN of the counter $COUNT_1$. The speed reduction switch is pushed to cause NAND circuit $NA_2$ to make the signal effective to the UP terminal UP. The OR circuit OR receives the four outputs from the counter $COUNT_1$ and gives them to NAND circuit $NA_1$. When the four outputs are all L, the OR circuit OR detects this and stops the DOWN input DOWN. When the four outputs are all H, the NAND circuit $NA_3$ detect this and stops the UP circuit UP via the NAND circuit $NA_2$. $FF_3$ is a D type flip-flop circuit having a gate terminal Cp connected to the oscillator $AM_1$ and having a data terminal D connected to the output of the NAND circuit $NA_3$, and having a complement side output Q which produces a signal of high level H for stopping the rotation of the motor M when the four signals are all at H of the counter $COUNT_1$. A reference numeral 3 is a pulse generating circuit for designating a motor speed, where an up-down counter $COUNT_2$ receives an encoded signal from the counter $COUNT_1$, and produces the output $B_1-B_4$ which is rendered pulse width of the speed designation via a NOR circuit $NOR_1$ and are given for controlling the speed. $AM_2$ is an oscillator producing a clock-pulse in a period considerably faster than that of the oscillator $AM_1$. $COUNT_3$ is a binary counter of 12 stages, which receives a pulse from the oscillator $AM_2$ at its gate terminal Cp. The counter has a 4th stage output $G_4$ dividing said pulse into 1/16 of the period, and connected to the count-down terminal DOWN of the counter $COUNT_2$ via an inverter $IN_2$ and a NOR circuit $NOR_3$. The NOR circuit $NOR_3$ has an input terminal connected to the output of the NOR circuit $NOR_1$. When the outputs $B_1-B_4$ of the counter $COUNT_2$ are all L, the NOR circuit $NOR_3$ is made inoperative to stop the COUNT-DOWN. The count-up terminal UP of the counter $COUNT_2$ is not used. A numeral 4 is a pulse generating circuit detecting the rotation speed of the sewing machine and producing a pulse in proportion to the rotation speed. SY is a speed detector producing symmetrical rectangular wave pulses of 23 periods per one rotation of an upper shaft of the sewing machine. A resistor $R_2$ and a capacitor $C_1$ compose a delay circuit. A signal wave of the speed detector SY and respective output waves of an inverter $IN_4$ and NAND circuit $NA_4$ receiving said signal wave make the output wave $IN_4$ of the potential of the capacitor $C_1$ as shown in FIG. 3 in which the lateral axis shows a time t. The output of the NAND circuit $NA_4$ is connected to the load terminal LOAD of the counter $COUNT_2$ so as to load the output $A_1$-$A_4$ of the counter $COUNT_1$ at a rising point of the signal from the speed detector SY, and is further connected to the reset terminal RESET of the counter $COUNT_3$ via inverter $IN_3$ so as to reset the counter at a falling point of the signal from the speed detector. A numeral 5 is a comparator circuit which compares the speed designating pulse of the speed designating circuit 3 and the rotation speed pulse of the pulse generating circuit 4. When the rotation speed is faster than the predetermined speed, the comparator circuit 5 is operated to lower the potential of a non-inverting input terminal (+) of an amplifier $OP_1$ in order to delay the ignition phase of $TRIAC_1$. On the other hand, it is operated to raise the potential when the rotation speed is lower than the predetermined speed. $AS_1$ is an analog switch for controlling the reduction of rotation speed, and has a control input $J_1$ connected to the output of the NOR circuit $NOR_1$ via the NOR circuit $NOR_4$ and is also connected to the output of the inverter $IN_4$ through NAND circuit $NA_5$. When the control input $J_1$ is H, it discharges the load current of the capacitor $C_2$ via the resistor $R_3$. $AS_2$ is an analog circuit for controlling the acceleration of rotation speed, and has a control input $J_2$ connected through NOR circuit $NOR_5$ to an inverter output by an inverter $IN_5$ of the NOR circuit $NOR_1$ and is connected to an output of the speed controller SY through a NAND circuit $NAND_6$. When the control input $J_2$ is H, it charges the capacitor $C_2$ via the resistors $R_3$, $R_4$. The NAND circuit $NA_5$, $NA_6$ are connected to an output $G_{12}$ of a 12th stage of the counter $COUNT_3$ via the inverter $IN_6$ to make a stop control of the motor, and receive a pulse of the oscillator $AM_2$ divided in $\frac{1}{4}K$ period. When the oscillator $AM_2$ does not receive a reset signal on the way for an enough time, the terminal $G_{12}$ is made H and the NAND circuit $NA_5$, $NA_6$ are made inoperative. Then the operation of the counter $COUNT_3$ is stopped due to the output $G_{12}$ connected to another input of the NOR circuit $NOR_2$. A numeral 6 is a motor stopping circuit, in which PS is a needle position detector detecting the upper and lower dead point of the needle and generates a symmetrical rectangular wave pulse of a period in one rotation of the upper shaft of the sewing machine. The motor stopping circuit 6 receives the output $\overline{Q}$ of the flip-flop circuit $FF_3$ after the operation of the stopping switch $S_P$ or after some continuous operation of the speed reduction switch $S_L$, and receives the detecting signal of the needle position detector PS, and then stops the ignition of $TRIAC_1$, thereby to stop the sewing machine with a determined position of the needle. SR is a shift resistor having a gate terminal Cp connected to the output of the NAND circuit $NA_4$, and having a serial input SI which receives a signal from the needle position detector PS via an exclusive OR circuit ExOR which selectively determines the needle stopping position of the lower dead point. Then, the shift resistor SR produces from the 5-bit parallel output terminal an output as a signal of a phase delayed by 5 clock pulses. Ss is a switch for selecting the needle stop position at the upper dead point or at the lower dead point. The switch is closed to select the needle stop position at the upper dead point, and is opened to select the needle stop position at the upper dead point. FIG. 4 shows the output waves of the circuit elements, and the output wave of the needle position detector PS designates at the rising point the upper dead point of the needle and designates at the falling point the lower dead point of the needle. The signal is applied as a low level L to the exclusive OR circuit ExOR when the change-over switch Ss is closed, and is applied as a high level H to the exclusive OR circuit when the change-over switch Ss is opened. When the switch Ss is closed the output of the exclusive OR circuit ExOR is made the same phase with the signal of the needle position detector PS, and when the switch Ss is opened, the output signal is inverted. The output $PO_5$ of the shift resistor SR is a signal of a phase delayed by 5 pulses of speed detector signal SY with respect to the input ExOR. An AND circuit AND receives a signal of the exclusive OR circuit ExOR and a signal inverted by the inverter $IN_7$ of the output of the shift resistor SR. These signals are made effective only when the output $\overline{Q}$ of the flip-flop circuit $FF_3$ is H. Thus the AND circuit AND produces a signal having a width of 5 pulses of the speed detecting signal SY as shown in FIG. 4. $AS_3$ is an analog switch for controlling an initial rotation and controlling a re-rotation at a reduced speed of the machine when the stopping position of the machine is changed. The analog switch $AS_3$ has a control input $J_3$ connected to an output $G_{12}$ of the 12th stage of the counter $COUNT_3$. When the input $J_3$ is H, the inverted input by the inverter $IN_8$ from the AND circuit AND is made operative to charge the capacitor $C_2$ via the resistor $R_5$, $R_3$. A numeral 7 is a circuit to trigger the gate of the thyristor $TRIAC_1$. The trigger circuit 7 has a reset terminal connected to the output of AND circuit AND. When it receives a reset signal, it stops the operation of the pulse transformer T to stop the sewing machine. A reference 8 is a circuit producing saw-form waves, namely the waves OP- showing a power source phase to the power source V as shown in FIG. 5. The circuit 8 is connected to an inverting input terminal (−) of the amplifier $OP_1$ for comparing the phase angle. Thus, the circuit constitutes a reference for controlling the phase of the thyristor $TRIAC_1$. The output of the amplifier $OP_1$ is connected to a gate Cp of the trigger 7, and the rising phase of the pulse is an ignition phase of the thyristor $TRIAC_1$ for controlling the speed of the motor M.

In the above mentioned structure with reference to FIG. 2, when the power source V and the control power source Vcc are supplied, each of the outputs $A_1$-$A_4$ of the counter $COUNT_1$ becomes H, and the output $\overline{Q}$ of the flip-flop circuit $FF_3$ becomes H. If this condition meets the stopping phase of the sewing machine based on the designation of the needle stopping position by the switch Ss, each of the inputs of the AND circuit AND becomes H, and the gate trigger circuit 7 is reset, and the sewing machine M is stopped at that phase (the case that the condition does not meet the stopping phase, will be described later).

Figure 6:
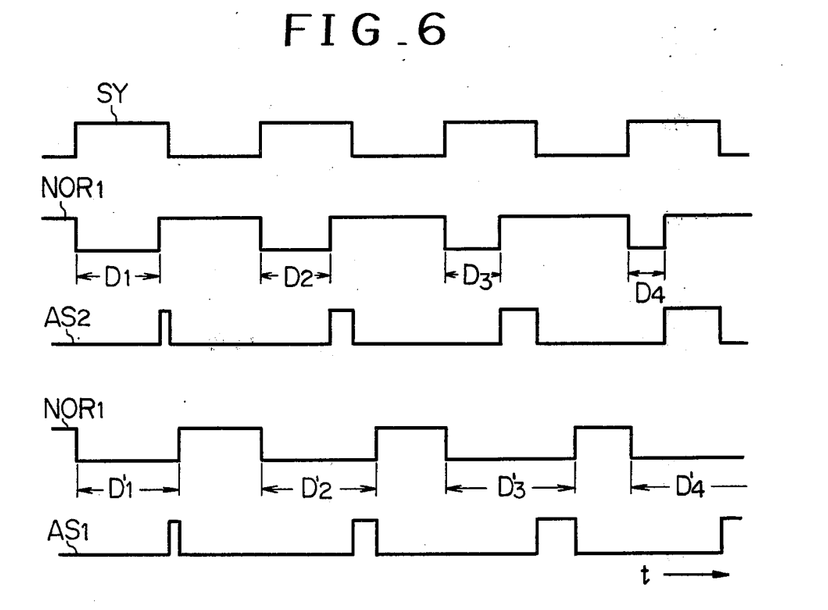

Then the speed acceleration switch $S_F$ is kept as it is pushed, the counter $COUNT_1$ counts down in the meantime with the operation period of the oscillator $AM_1$. Thus the value of the outputs $A_4$, $A_3$, $A_2$, $A_1$ is maintained when the switch $S_F$ is released. At the initial counting down, the output Q of the flip-flop circuit $FF_3$ becomes low level L and the gate trigger circuit 7 is released from a reset condition. At this time, as the gate $J_3$ of the machine starting analog switch $AS_3$ becomes H during a certain stopping time of the sewing machine, the capacitor $C_2$ is charged via the resistor $R_5$, $R_3$. When the potential $OP_1+$ rises of the operation amplifier $OP_1$, for example, to the potential as shown in FIG. 5, the conductive wave of the thyristor $TRIAC_1$ which ignites at a crossing point with the potential $PO_1-$ becomes as shown in the solid lines with respect to the power source voltage including dotted lines (for the sake of simplifying explanation, it is assumed that the motor M is a loaded resistor), and the motor M starts rotation. Then, when the NAND circuit $NA_4$ generates a pulse as shown in FIG. 3, the counter $COUNT_3$ is reset and the output $G_{12}$ becomes L, and then the analog switch $AS_3$ is opened (OFF). At the same time, the counter $COUNT_2$ loads the speed designating signal $A_1-A_4$. Since the signal includes H, the NOR circuit $NOR_1$ becomes L and the counter $COUNT_2$ starts counting down per pulse from the output $G_4$ of the counter $COUNT_3$. When a certain time passes, the outputs $B_1-B_4$ become all L and the NOR circuit $NOR_1$ becomes L. The time from L to H becomes shorter, as shown by the pulse width $D_1-D_4$... in FIG. 6, as the code value of the speed designating signals $A_1-A_4$ becomes smaller, that is, as the time of pushing the switch $S_F$ becomes longer. Accordingly, the time ON of the speed acceleration analog switch $AS_2$ is increased to elevate the level $OP_1+$ in FIG. 5, and the crossing points between the level $OP_1+$ and the level $OP_1-$ move to the left in FIG. 5. As a result, the ignition angle of the thyristor $TRIAC_1$ is enlarged, and the rotation speed of the motor M is increased. In FIG. 6, the rotation speed SY of the sewing machine is constant, because as the rotation speed of the motor M increases, the period of the signal SY becomes shorter and the pulse width of the signal $AS_2$ becomes narrower to such a degree that the pulse is almost nonexistent, and the motor M is rotated at a designated constant speed.

When the speed reduction switch $S_L$ is kept as it is pressed for a certain time, the counter $COUNT_1$ counts up and maintains the outputs $A_4$, $A_3$, $A_2$, $A_1$ at time of releasing the switch $S_L$. With the time elapse of pressing the switch $S_L$, that the pulse width becomes wider as shown by $D'_1-D'_4$ in FIG. 6 to lengthen the ON time of the speed reduction analog switch $AS_1$. As a result, the level $OP_1+$ in FIG. 5 is lowered, and the rotation speed of the motor M is reduced. As the rotation is reduced, the pulse width of the signal $AS_1$ becomes narrower to such a degree that the pulse is almost nonexistent, and the motor M is rotated at a designated constant speed.

When the motor stopping switch $S_P$ is pushed, the outputs $A_1-A_4$ of the counter $COUNT_1$ become all H, and the reduction designating signal $D'_1-D'_4$ becomes the maximum width, and the reduction analog switch $AS_1$ rapidly lowers the potential $OP_1+$ in FIG. 5. As a result the rotation speed of the motor M is rapidly reduced. As the motor is ready for stopping, the analog switch $AS_1$ becomes OFF. On the other hand, if the output $\overline{Q}$ of the flip-flop $FF_3$ is H due to the operation of the analog switch SP and the switch Ss is in a condition for stopping the needle at the upper dead point as shown in FIG. 2, the output of the AND circuit AND makes H per rising point of the signal from the needle position detector PS in the region between the predetermined rotation angles of the sewing machine in the same manner as the changeover switch Ss is ON in FIG. 4. In this high level period of the AND circuit, the gate trigger circuit 7 of the thyristor $TRIAC_1$ is reset and the driving torque of the motor M is made 0 in order to stop the motor in this period. However, in this case, if the rotation of the motor M does not yet reach the speed lower enough for stopping in this period, the sewing machine continues to rotate over this period due to inertia, and when the AND circuit AND becomes L, the gate trigger circuit 7 is released from the reset condition and the output $G_{12}$ of the counter $COUNT_3$ becomes H in the meantime. As a result, the analog switch $AS_3$ is ON to slightly elevate the (+) side level of the operation amplifier $OP_1$, thereby to re-rotate the motor M. As the motor speed is reduced enough, the motor M is stopped in the H period of the AND circuit AND in FIG. 4, that is, at the upper dead point of the needle. As this stopping time of the machine, the condition of the circuit elements is the same as they were when the power source was applied.

When the changeover switch Ss is made OFF in order to stop the sewing machine at the lower dead point of the needle, the H level phase of the AND circuit AND corresponds to the falling signal of the needle position detector PS as SsOFF in FIG. 4. As a result, the motor M is again driven and stops after 180° rotation of the sewing machine, i.e. at the lower dead point of the needle.

Figure 7:
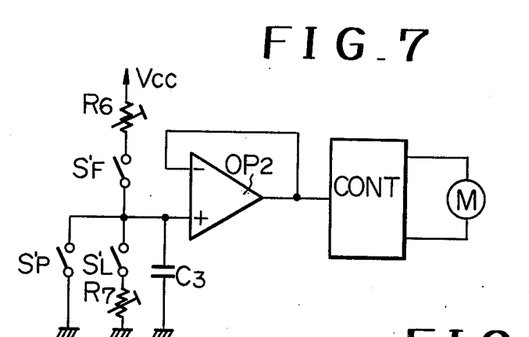
FIG. 7–FIG. 10 show the other embodiments of the above control circuits.
Figure 8:
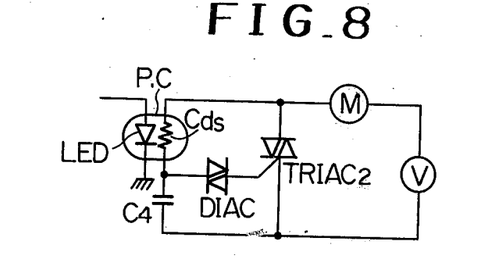

FIG. 7 shows another embodiment of the control circuit using an analog signal while the speed designating circuit 2 in FIG. 2 uses a digital signal. $OP_2$ is an operation amplifier having a non-inverting terminal (+) receiving a charged voltage of the capacitor $C_3$ as a speed designating input. $R_6$ is a semi-fixed resistor, one end of which is connected to the control power source Vcc, and constitutes an element through which the capacitor is charged with a time constant determined by the resistor and the capacity of the capacitor when the accelerating switch $S'_F$ is closed. $R_7$ is a semi-fixed resistor one end of which is grounded, and constitutes an element through which said capacitor discharges with a time constant determined by the resistor and the capacity of the capacitor when the reduction designating switch $S'_L$ is closed. $S'_P$ is a motor stopping switch which is operated to directly and instantly discharge the capacitor without the need of resistor element. The inverting input terminal (−) of the operation amplifier $OP_2$ is connected to the output of the amplifier itself to constitute a voltage follower, and said output is connected to a voltage input type speed control circuit CONT to control the motor M. This voltage input type speed controlling circuits, for example as shown in FIG. 8, a light source LED of a photocoupler P.C receiving an output signal of the amplifier $OP_2$. In this case, the resistance value of a photo-conductor element CdS of the photocoupler is controlled, and the triac $TRIAC_2$ is phase-controlled via a diac DIAC to control the speed of the motor 4. $C_4$ is a resistor. If the output of the amplifier $OP_2$ is connected to, e.g., (+) side input of the amplifier $OP_1$ in FIG. 2, the voltage input type speed control circuit CONT in FIG. 7 can be composed of the amplifier $OP_1$ the gate trigger circuit 7, the saw wave producing circuit 8, the pulse transformer T, the triac $TRIAC_1$, to control the speed of the motor M.

Figure 9:
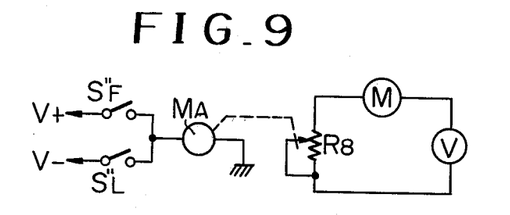

FIG. 9 shows an embodiment which variably controls the resistance value for controlling the motor speed, while FIG. 2 and FIG. 7 disclose the embodiments which control the semi-conductors for controlling the motor speed. In this figure, MA is a control motor which reduces the value of the variable resistor $R_8$ during closing a speed acceleration switch $S''_F$, and increases it during closing a speed reduction switch $S''_L$ so as to accelerate or reduce the speed of the motor M. V+ and V− are a plus power source and a minus power source of the motor MA.

Figure 10:
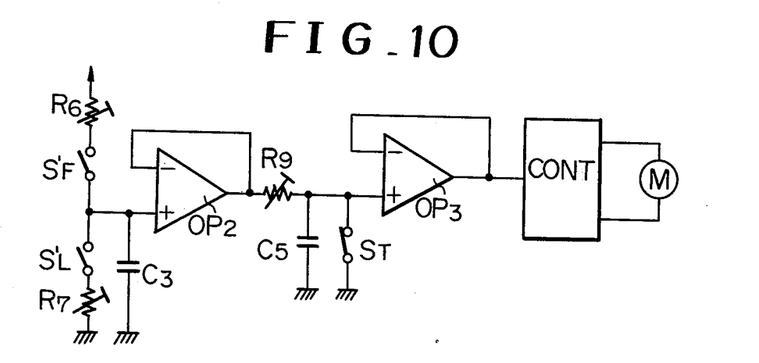

FIG. 10 shows a still another embodiment of a control circuit composed to drive the motor M with memorized set speed. The embodiment, instead of a stopping switch $S'_P$ in FIG. 7, provides a capacitor $C_5$ charging the output of the operation amplifier $OP_2$ via the semi-fixed resistor $R_9$ and a memory starting switch $S_T$ connected in parallel to the capacitor to charge and discharge the latter. Further, a non-inverting input terminal (+) of the operation amplifier $OP_3$ is so connected as to receive the charged voltage of the capacitor $C_5$. The output of the operation amplifier $OP_3$ is connected to the inverting terminal (−) of the same amplifier and constitute a voltage follower, and this output is also connected to the voltage input type speed control circuit CONT to control the motor M. The explanation is omitted to the parts common to those in FIG. 7.

In FIG. 10, if the memory starting switch $S_T$ is opened, and the potential of the capacitor $C_3$ is determined by the speed acceleration designating switch $S'_F$ and the speed reduction designating switch $S'_L$ and then the potential of the capacitor $C_5$ is also determined, and the motor M is controlled in a speed designated by the switches $S'_F$, $S'_L$. In this condition, when the memory starting switch $S_T$ is closed the capacitor $C_5$ is instantaneously discharged and the motor M is stopped. Further, when the memory starting switch $S_T$ is opened, the output of the operation amplifier $PO_2$ charges the capacitor $C_5$ with a time constant determined by the resistor $R_9$ and the capacity of the capacitor $C_5$, and the output voltage of the amplifier $OP_3$ increases as the charged voltage increases, and the speed of the motor M gradually increases up to a speed designated by the switches $S'_F$, $S'_L$. The resistor $R_9$ may be adjusted slowly to increase the charged voltage so that the rotation of the motor M may be started slowly.

We claim:

1. A control circuit for use with electric motors and the like, particularly with electric motors in sewing machines, the circuit allowing a user to select a desired operating speed from a plurality of available operating speeds, and to vary such selected speed at will, the control circuit automatically causing the motor to maintain such desired operating speed until a user varies it comprising:

a manually operable programmer producing a digital code signal which represents a desired operating speed, the programmer operating in a manner that the code signal produced can be varied to provide a plurality of codes corresponding to a plurality of available operating speeds and any code provided will be maintained until changed by a user;

a clock pulse generator producing clock pulses of constant frequency;

a clocked and programmable counter, the counter being connected to the programmer in order to be programmed thereby and being connected to the clock pulse generator in order to be clocked thereby and operating in a manner that when the counter is programmed with a code signal it will count one count away from the code signal each time the counter receives a clock pulse and will cease to count after counting to a predetermined number, the counter generating a digital drive signal, the drive signal having a first value when and only when the counter is counting and having a second value when and only when the counter has ceased to count, the counter further operating in a manner that it can always be reprogrammed with a code signal to begin counting again;

a buffer responsive to the drive signal and producing an analog control signal, the control signal increasing when the drive signal has its second value and decreasing when the drive signal has its first value;

a switch circuit in series with the motor, whereby the motor is turned on when the switch circuit is closed and whereby the motor is turned off when the switch circuit is opened;

a switch control responsive to the analog signal and cooperating with the switch circuit in a manner that the switch circuit is closed and opened in response to changes of the analog signal; and a reprogram pulse generator responsive to position of the motor and cooperating with the counter, the reprogram pulse generator generating a reprogram pulse every time the motor rotates through a predetermined angle, whereby the counter is periodically reprogrammed with the code maintained by the programmer when such reprogramming occurs.

2. The circuit defined by claim 1 wherein the programmer includes a binary counter with parallel outputs, a second clock pulse generator, a first pushbutton switch, a second pushbutton switch, and a third pushbutton switch all being connected together in a manner that the second clock pulse generator is connected to the binary counter to cause the counter to count down when the first pushbutton switch is closed, the second clock pulse generator is connected to the binary counter to cause the second binary counter to count up when the second pushbutton switch is closed, and the outputs of the counter are preset with a predetermined code signal when the third pushbutton switch is closed.

3. The circuit defined by claim 2, wherein the binary counter has parallel inputs, and wherein the outputs of the binary counter are connected to the inputs of the programmable counter.

4. The circuit defined by claim 1, wherein the analog control signal is derived from a voltage across a capacitor.

5. The circuit defined by claim 1, wherein the switch circuit includes a triac in series with the motor.

6. The circuit defined by claim 4 wherein the buffer includes an operational amplifier with an inverting input and a non-inverting input, a capacitor, and a sawtooth signal generator, the sawtooth signal generator being connected to the inverting input of the operational amplifier and the capacitor being connected between the non-inverting input of the operational amplifier and ground.

7. The circuit defined by claim 3, wherein the binary counter has a minimum output and a maximum output, further including means for disconnecting the second clock pulse generator from the counter independently of the pushbutton switches, the means operating in such a manner as to prevent the counter from counting down after the minimum output has been reached and further to prevent the counter from counting up after the maximum output has been reached.

8. The circuit defined by claims 1, 2, 3, 4, 5, 6, or 7, wherein the plurality of codes includes a code corresponding to a motor speed of zero.

9. The circuit defined by claim 8, further including a stop monitor responsive to position of a motor driven element and cooperating with the switch control in a manner that when the code corresponding to a motor speed of zero is selected, the motor will continue to operate until the motor driven element has reached a predetermined position.

10. The circuit defined by claim 9, wherein the stop monitor is adjustable to vary the predetermined position.

11. The circuit defined by claim 8, further including a motor and a sewing machine driven by the motor.

* * * * *

UNITED STATES PATENT AND TRADEMARK OFFICE
CERTIFICATE OF CORRECTION

PATENT NO. : 4,332,208
DATED : June 1, 1982
INVENTOR(S) : Toshiaki Watasue et al.

It is certified that error appears in the above—identified patent and that said Letters Patent is hereby corrected as shown below:

On the title page, Item /73/ Assignee: should read

--- Janome Sewing Machine Co., Ltd., Tokyo, Japan and Oki Electric Industry Co., Ltd., Tokyo, Japan ---.

Signed and Sealed this

Nineteenth Day of April 1983

[SEAL]

Attest:

GERALD J. MOSSINGHOFF

Attesting Officer — Commissioner of Patents and Trademarks